United States Patent
Illy et al.

(10) Patent No.: US 11,419,445 B2
(45) Date of Patent: Aug. 23, 2022

(54) METHOD AND MACHINE FOR PREPARING BEVERAGES

(71) Applicant: AMICI CAFFE' AG, Cham (CH)

(72) Inventors: Francesco Illy, Maloja (CH); Kurt Schmid, Cham (CH)

(73) Assignee: AMICI CAFFE' AG, Cham (CH)

( * ) Notice: Subject to any disclaimer, the term of this patent is extended or adjusted under 35 U.S.C. 154(b) by 205 days.

(21) Appl. No.: 15/780,237

(22) PCT Filed: Nov. 30, 2016

(86) PCT No.: PCT/IB2016/057217
§ 371 (c)(1),
(2) Date: May 30, 2018

(87) PCT Pub. No.: WO2017/093910
PCT Pub. Date: Jun. 8, 2017

(65) Prior Publication Data
US 2018/0352994 A1    Dec. 13, 2018

(30) Foreign Application Priority Data
Nov. 30, 2015 (IT) ................. 102015000078446

(51) Int. Cl.
*A47J 31/32* (2006.01)
*A47J 31/44* (2006.01)
*A47J 31/52* (2006.01)

(52) U.S. Cl.
CPC ........... *A47J 31/32* (2013.01); *A47J 31/4403* (2013.01); *A47J 31/52* (2013.01)

(58) Field of Classification Search
CPC ......... A47J 31/32; A47J 31/4403; A47J 31/52
See application file for complete search history.

(56) References Cited

U.S. PATENT DOCUMENTS 3,405,630 A * 10/1968 Weber, III ............. C02F 1/003
99/298
4,947,738 A * 8/1990 Eugster ................. A47J 31/461
99/293

(Continued)

FOREIGN PATENT DOCUMENTS

EP       1922963 A1    5/2008

OTHER PUBLICATIONS

European Patent Office—International Search Report dated Feb. 3, 2017 for International Application No. PCT/IB2016/057217 (3 pgs).

(Continued)

*Primary Examiner* — Stephanie A Cox
(74) *Attorney, Agent, or Firm* — Womble Bond Dickinson (US) LLP

(57) ABSTRACT

A method and a machine for preparing beverages, wherein the machine has a liquid feeding unit, a gas source at atmospheric pressure, an infusion chamber and an infusion circuit; wherein during a dispensing cycle for preparing a beverage the method provides the following steps: at least partially filling the circuit with gas at atmospheric pressure by means of said gas source; feeding the liquid into the circuit by means of said feeding unit so as to push inside the infusion chamber, filled with the infusion product, some gas already present in the circuit before the inlet of the liquid; and dispensing the beverage.

15 Claims, 4 Drawing Sheets

(56) References Cited

U.S. PATENT DOCUMENTS

| | | | |
|---|---|---|---|
| 2010/0034942 A1* | 2/2010 | Illy | A47J 31/002 |
| | | | 426/433 |
| 2012/0156337 A1 | 6/2012 | Studor et al. | |
| 2015/0017297 A1* | 1/2015 | Vastardis | A47J 31/002 |
| | | | 426/429 |

OTHER PUBLICATIONS

European Patent Office—Written Opinion dated Feb. 3, 2017 for International Application No. PCT/IB2016/057217 (5 pgs).

* cited by examiner

METHOD AND MACHINE FOR PREPARING BEVERAGES

CROSS-REFERENCE TO RELATED APPLICATIONS

This patent application is a U.S. National Phase Application under 35 U.S.C. § 371 of International Application No. PCT/IB2016/057217, filed 30 Nov. 2016, entitled METHOD AND MACHINE FOR PREPARING BEVERAGES, which claims priority to Italian Patent Application No. 102015000078446, filed 30 Nov. 2015.

TECHNICAL FIELD

The present invention relates to a method and a machine for preparing beverages, in particular infusions such as coffee or tea.

BACKGROUND ART

For preparing hot drinks such as coffee or tea, it is already known the use of machines comprising an infusion circuit in which water is heated to a temperature of about 90° C. or more and is injected into an infusion chamber housing the infusion product. For example, the infusion product may be in the form of dust or leaves, may be loose or contained in capsules or tablets.

The document EP2083661 relates to a method and a machine for preparing infusions injecting pressurized gas into the infusion chamber simultaneously or before the introduction of water, thus exalting the organoleptic properties of the infusion product. Such method and machine have the disadvantage of requiring the provision of bulky systems for pressurizing the gas (such as compressors) or for supplying the pressurized gas (such as pressurized cylinders).

DISCLOSURE OF INVENTION

The object of the present invention is to provide a method and a machine for preparing beverages, which overcome the aforesaid problems.

In particular, the object of the present invention is to provide a method and a machine of reduced size for preparing beverages, which nevertheless ensure a high organoleptic quality of the beverages.

The object of the present invention is to provide a method and a machine for preparing beverages as recited in the appended claims.

BRIEF DESCRIPTION OF THE DRAWINGS

The invention will now be described with reference to the accompanying drawings, showing non-limiting embodiments, in which.

DETAILED DESCRIPTION

Figure 1:
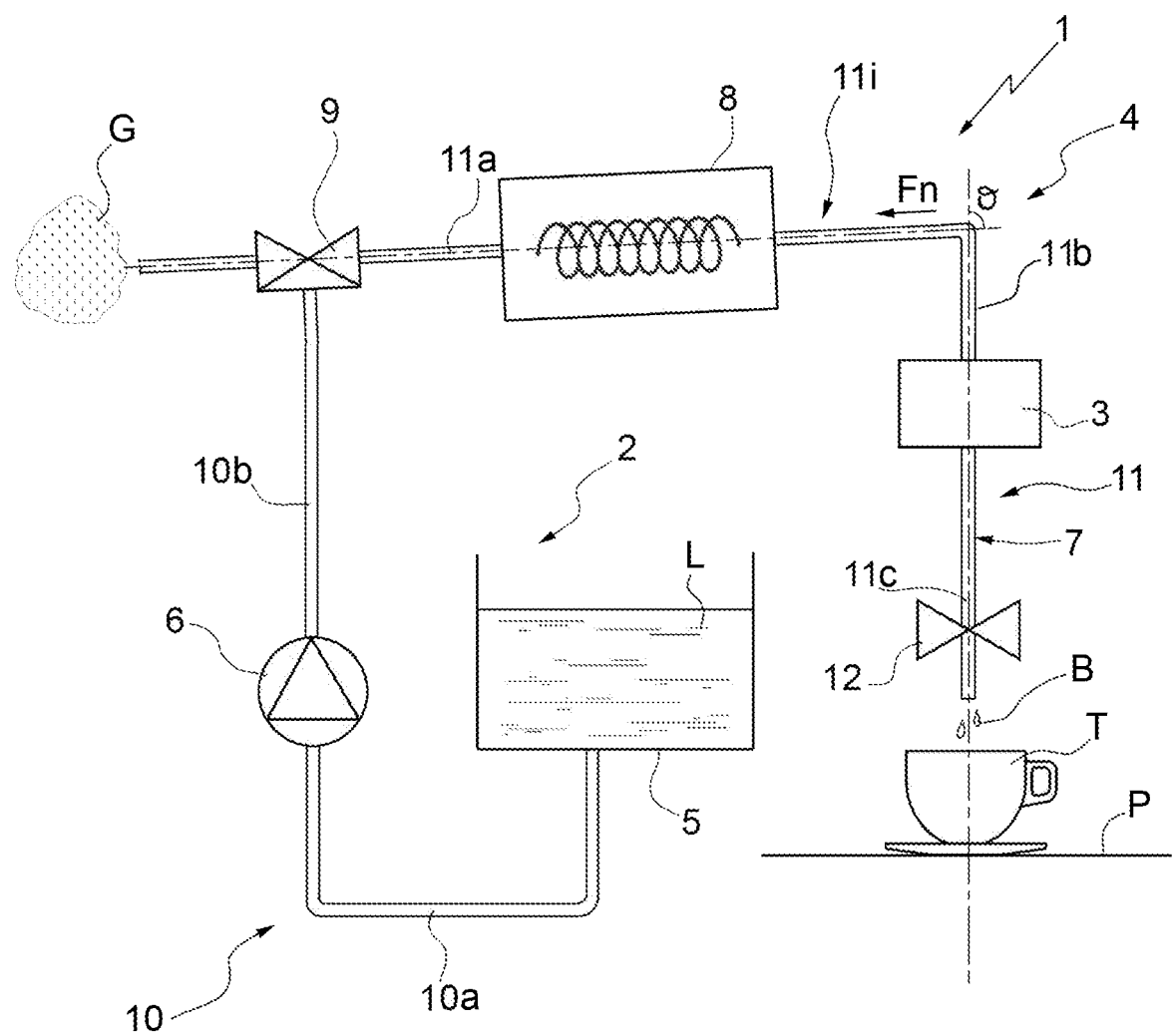
FIG. 1 is a schematic view of a first embodiment of the machine according to the present invention.

In FIG. 1, the reference number 1 indicates in its entirety a machine for preparing beverages, in particular infusions such as coffee or tea. The machine 1 comprises a unit 2 for feeding the liquid L, in particular water, an infusion chamber 3 for preparing beverages B and an infusion circuit 4.

The feeding unit 2 in turn comprises a water tank 5 and a pump 6. According to a variation not shown, the feeding unit 2 comprises a pump 6 supplying the liquid L directly from a hydraulic network. Advantageously, the pump 6 is a self-priming pump.

In turn, the infusion circuit 4 comprises: a duct 7 connecting in a known way the pump 6 with the infusion chamber 3, and a heat exchanger 8, which is arranged along the duct 7 and heats in a known way a liquid in the infusion circuit 4.

Advantageously, the infusion circuit 4 comprises a source 9 configured to enter a gas G at atmospheric pressure, in particular air at atmospheric pressure, in the infusion circuit 4. Advantageously, the source 9 is arranged in said duct 7 between the feeding unit 2 and the infusion chamber 3. Advantageously, the source 9 enters the gas at atmospheric pressure in the duct 7, thus creating an air cushion that is forced, in use, in the infusion chamber 3 by means of the liquid L supplied by the feeding unit 2.

As shown in FIG. 1, in the machine 1 the gas source 9 is a valve, in particular a three-way valve. For example, the valve 9 is a solenoid valve. The valve 9 is arranged in the duct 7 between the pump 6 and the exchanger 8. The valve 9 divides the duct 7 in an initial portion 10 and in a final portion 11. In particular, the initial portion 10 comprises: a portion 10a connecting the water tank 5 with the inlet of the pump 6; a portion 10b connecting the delivery side of the pump 6 with the source 9. In particular, the final portion 11 comprises: a portion 11a connecting the source 9 with the heat exchanger 8; a portion 11b connecting the heat exchanger 8 with the infusion chamber 3; a portion 11c at the outlet of the infusion chamber 3 for dispensing the beverage B.

Advantageously, the machine 1 comprises a delivery valve 12 arranged in the portion 11c, downstream of the infusion chamber 3, configured to control the dispensing of the beverage B from the infusion chamber 3.

The initial portion 10 is connected to the pump 6 and, in use, is crossed only by the liquid L. The final portion 11 is crossed, in use, both by the liquid L and by the gas G, as explained in more detail below.

Advantageously, the three-way valve 9 can be selectively arranged in:

a gas opening position, where it opens the passage of the gas from the outside to the final portion 11 of duct 7 and, simultaneously, closes the passage of the liquid to the final portion 11;

a liquid opening position, where it closes the passage of the gas from the outside to the final portion 11 and, simultaneously, opens the passage of the liquid to the final portion 11.

For example, the machine 1 dispenses from the top the beverage B in a cup T arranged at a dispensing position E and, for example, the cup T lies on a horizontal support surface P.

Advantageously, the final portion 11 is inclined, at least in part, with respect to a vertical axis perpendicular to a support surface P. As shown in FIG. 1, the portion 11a and part of the portion 11b form an inclined segment 11i of the final portion 11. The inclined segment 11i is oriented so that a liquid, flowing inside the inclined segment 11i toward the infusion chamber 3, is pushed against the gravity force. In other words, at least along a part of the final portion 11, the gravity force is contrary to the advancement of a liquid flowing from the source 9 to the infusion chamber 3. This advantageously avoids that in use, the liquid L is mixed to the gas G before reaching the infusion chamber 3. Therefore, thanks to the upward inclination θ of at least a segment (11i) of the final portion 11 (i.e. contrary to the gravity force in the crossing direction of the flow) it is avoided that the liquid L can be mixed to the gas G or can enter the infusion chamber 3 before the gas G due to the gravity force. Advantageously, the flow section and the level of inclination θ of the final portion 11 create a negative force (schematically shown with an arrow Fn in FIG. 1) that the liquid L must oppose to reach the infusion chamber 3. Advantageously, the negative force Fn is directly proportional to the gravity force and is given by the relation $$Fn = c \times \vec{g}$$

in which:

$\vec{g}$ is the gravity force;

c is a multiplying coefficient function of the size and the inclination θ of the inclined segment 11i.

Advantageously, the negative force Fn, and consequently the size and the inclination θ of the inclined segment 11i, is defined based on the amount and the pressure of the gas G to be introduced in the infusion chamber 3 before the arrival of the liquid L. Advantageously, the negative force Fn is defined so as to prevent the liquid L, under the effect of the gravity force $\vec{g}$, from entering the infusion chamber 3 before the gas G.

Advantageously, the size and the inclination θ of the inclined segment 11i are determined so that the amount of gas G to be pressurized is comprised between a minimum of 3 cc and a maximum of 1000 cc.

Figure 2:
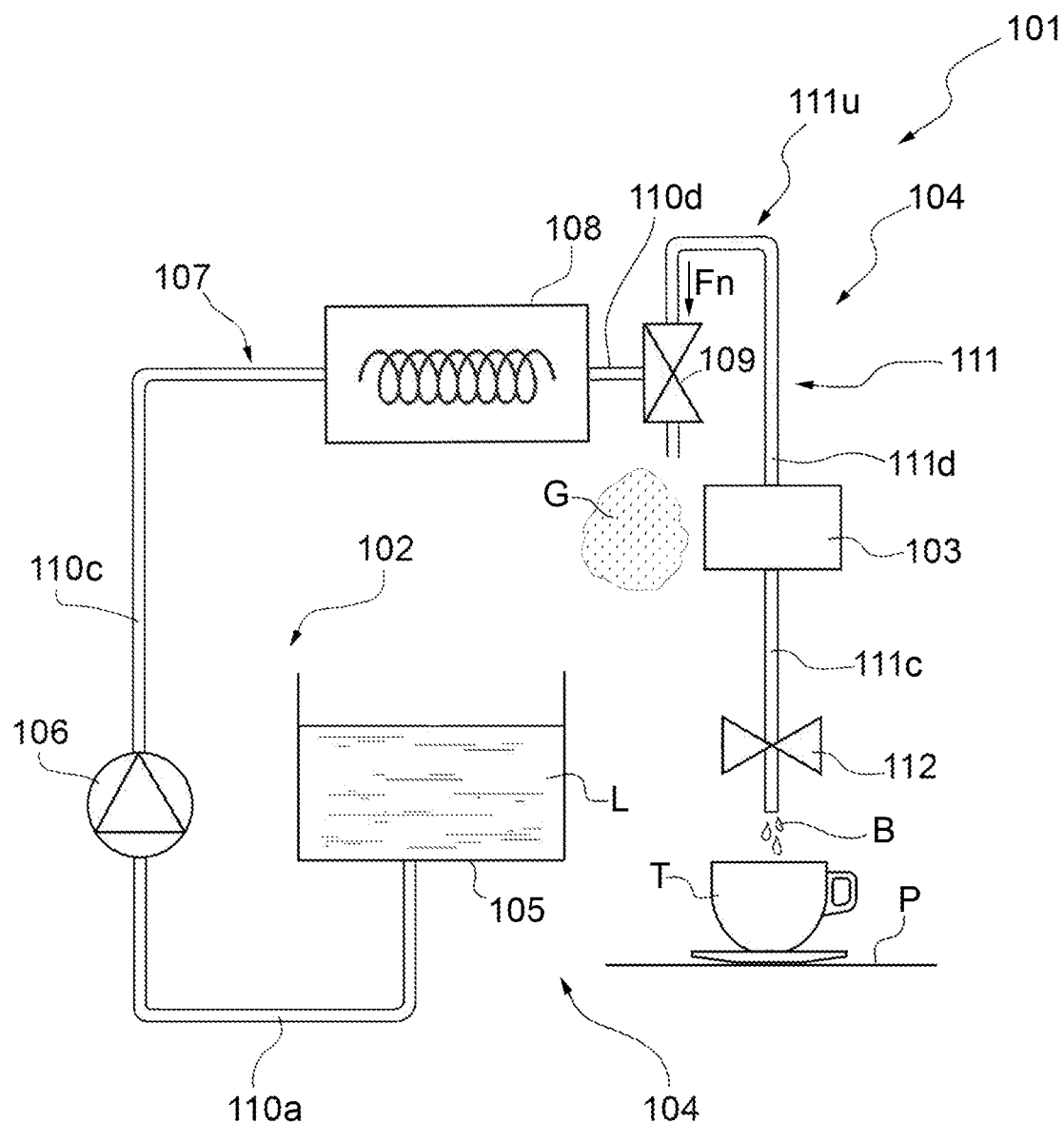
FIG. 2 is a schematic view of a second embodiment of the machine according to the present invention.

In FIG. 2, 101 indicates a variant of the machine 1. In FIG. 2 the components in common with the machine 1 have the same numbering, but in the order of hundreds. In the machine 101 the gas source 109 is a valve arranged downstream of the heat exchanger 108. The valve 109 selectively allows the passage of gas G from the outside to the inside of the infusion circuit 104. In particular, the valve 109 is arranged between the heat exchanger 108 and the infusion chamber 103. For example, the valve 109 is a solenoid valve.

As shown in FIG. 2, the initial portion 110 comprises: a portion 110a connecting the water tank 105 with the inlet of the pump 106; a portion 110c connecting the delivery side of the pump 106 with the exchanger 108; a portion 110d connecting the heat exchanger 108 with the source 109.

As shown in FIG. 2, the final portion 111 comprises: a portion 111d connecting the source 109 with the infusion chamber 103; and a portion 111c at the outlet from the infusion chamber 103 for dispensing the beverage B.

The final portion 111, downstream of the source 109 according to the direction of advancement of the liquid in the circuit 104, is curved. In particular, the portion 111d has a U-shaped curve 111u (generally indicated also as gooseneck), whose concavity faces a horizontal support surface P of the cup T. Advantageously, the curve 111u of the portion 111d is such to generate a negative force (schematically shown with an arrow FN in FIG. 2) that the liquid L must oppose to reach the infusion chamber 103. Advantageously, in the solution shown in FIG. 2, the amount of compressible gas G in the final portion 111 depends on the size (length and cross-section) of the portion perpendicular to the horizontal plane P of the curve 111u, i.e. of portions at least partly inclined with respect to the plane P along which the gravity force $\vec{g}$ exerts a contrasting action against the liquid flowing in the infusion chamber 103.

Advantageously, the curve 111u prevents the liquid L from flowing, under the effect of the gravity force $\vec{g}$, in the infusion chamber 103 before and/or simultaneously with the gas G.

According to a variant not shown, the infusion chamber 3 (103) is vertically arranged above the source 9 (109). In other words, the source 9 (109) is vertically interposed between the infusion chamber 3 (103) and a support surface P. Also in this case, analogously to what described in FIGS. 1 and 2, the final portion 11 (111) is inclined so as to prevent the liquid from flowing, under the effect of the gravity force $\vec{g}$, in the infusion chamber 3 (103) before and/or simultaneously with the gas G.

Figure 3:
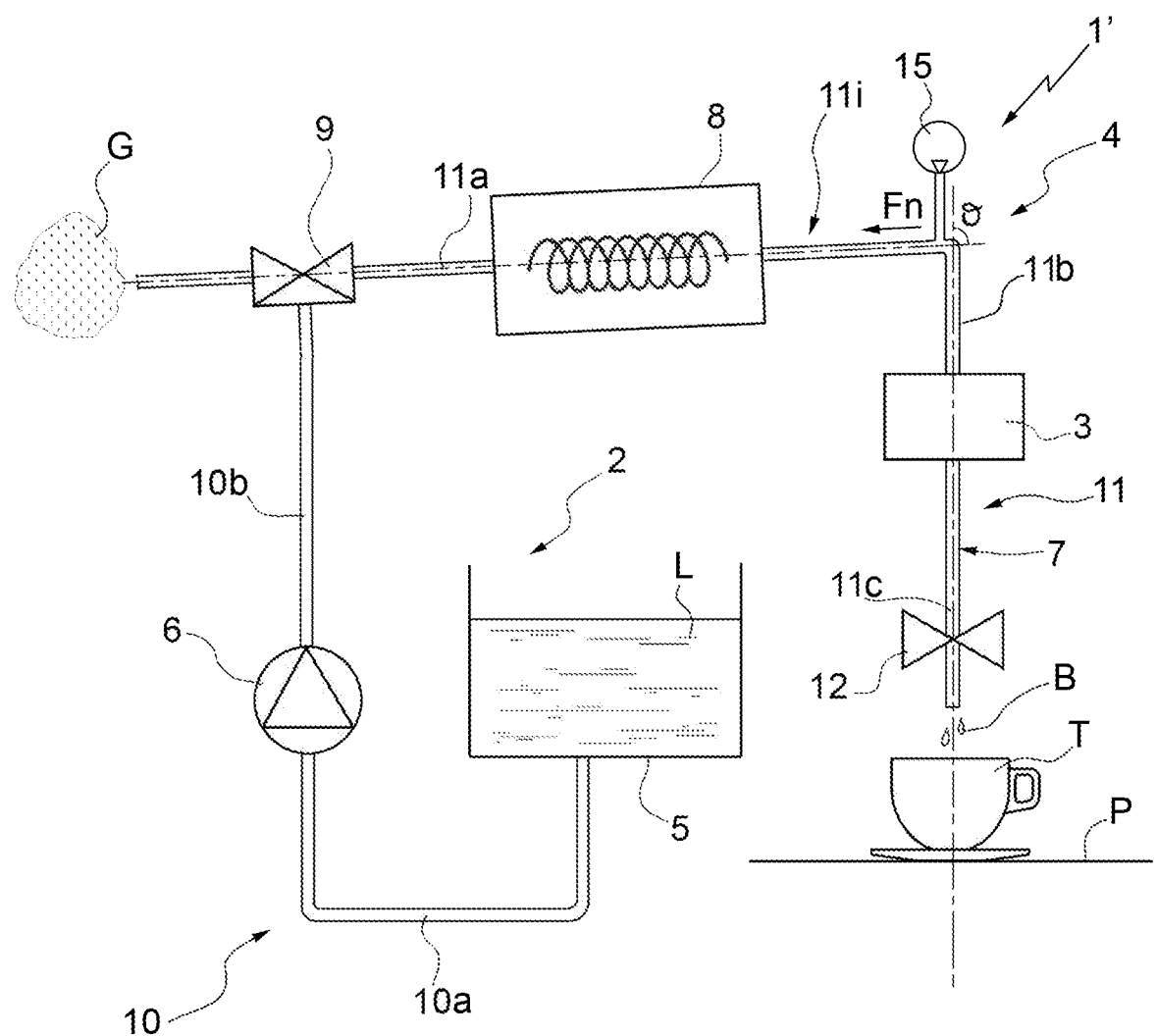
FIG. 3 is a schematic view of a variant of the machine shown in FIG. 1.

In FIG. 3, the reference number 1' is a variant of the machine 1 shown in FIG. 1. In FIG. 3, the components in common with the machine 1 are indicated with the same numbers. The machine 1' substantially comprises all the components already described for the machine 1. In addition, the machine 1 includes a pressurized gas G feeding system 15, for example a compressor, feeding the pressurized gas G in the duct 7. In particular, the system 15 feeds the gas G in the inclined segment 11i downstream of the source 9.

Figure 4:
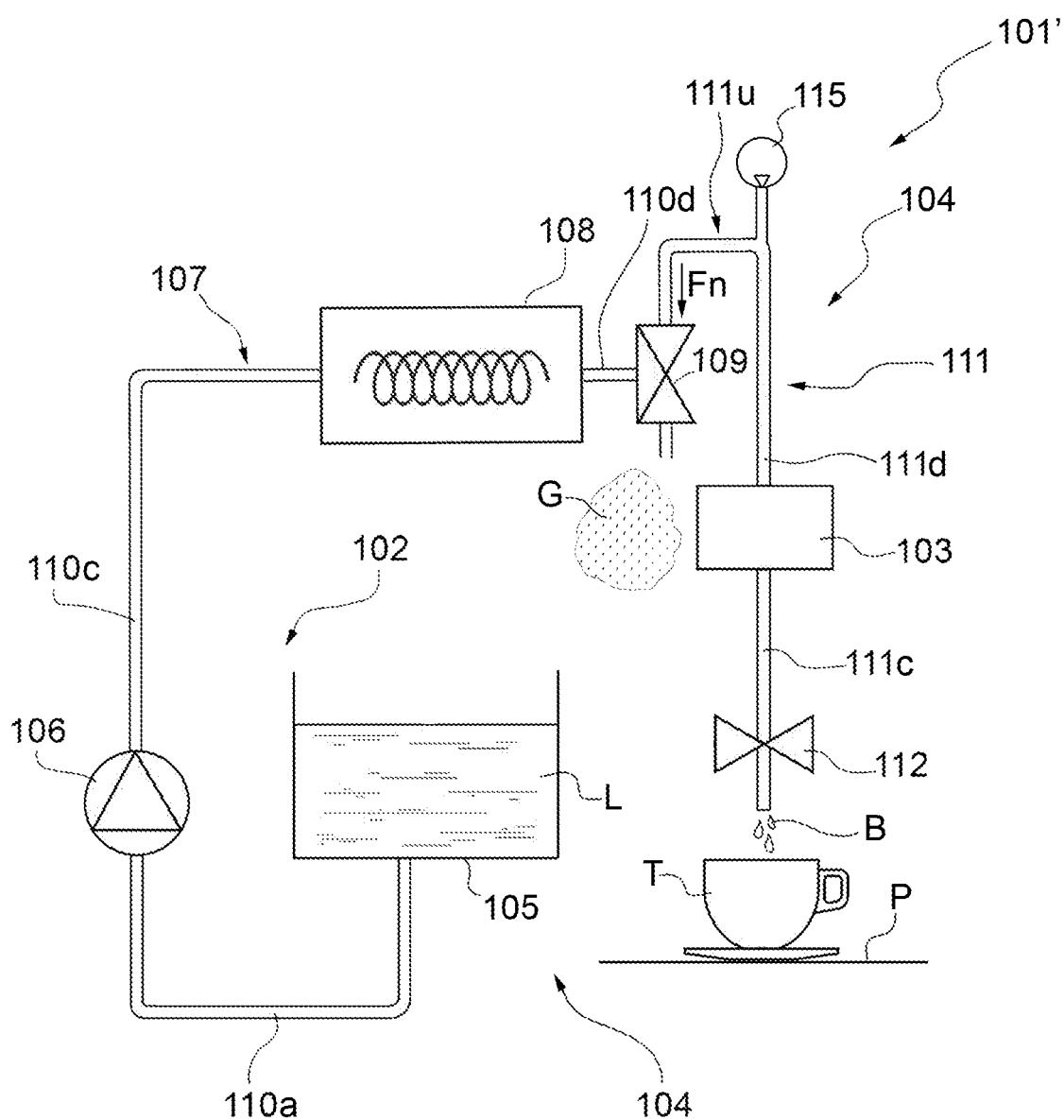
FIG. 4 is a schematic view of a variant of the machine shown in FIG. 2.

In FIG. 4, 101' indicates a variant of the machine 101 shown in FIG. 2. In FIG. 4, the components in common with the machine 101 of FIG. 2 have the same numbers. The machine 101' comprises all the components of the machine 101. The machine 101' further comprises a pressurized gas G feeding system 115 in the duct 107. In particular, the system 115 feeds the gas G in the segment 111u, downstream of the source 109.

Advantageously, the pressurized gas G feeding system 15 or 115 is a compressor configured for supplying a gas, for example air, at a pressure of about 2 bar. Advantageously, the compressor 15 or 115 is small-sized.

According to a variant not shown, and in addition to or instead of the delivery valve 12 (112), the final portion 11 (111) of the duct 7 (107) (preferably close to the infusion chamber 3, 103) has means configured to determine the flow and the pressure of the gas G and/or the beverage B in the duct 7 (107). For example, the duct 7 (107) may comprise bottlenecks or equivalent elements to increase or decrease the pressure of the gas and/or of the beverage B in the duct 7 (107).

In use, when the machine 1 (101) is off, the infusion circuit 4 (104) is filled with gas G, in particular air, at atmospheric pressure. The heat exchanger 8 (108) is activated in order to heat the liquids flowing inside the infusion circuit 4 (104) upstream of the infusion chamber 3 (103).

During a dispensing cycle for preparing a beverage B, starting from the disabled machine 1 (101) in which the infusion circuit 4 (104) is already filled with gas G at atmospheric pressure, the gas source 9 (109), e.g. the three-way valve, is disposed in the liquid opening position to allow the flowing of the liquid L in the infusion circuit 4 (104) and to prevent, at the same time, the outflow of the gas G from the circuit through the gas source 9 (109).

Therefore, the feeding unit 2 (102) is activated to push the gas G, already present in the infusion circuit 4 (104), in the infusion chamber 3 (103). The G gas enters the infusion chamber 3 (103) before the liquid L.

In this way, the gas G in the infusion circuit 4 (104) is partially pressurised by the liquid L. Therefore, the partially pressurised gas G is introduced in the infusion chamber 3 (103).

After a set contact time of the infusion product with the liquid L and the gas G, the delivery valve 12 (112) is opened to allow the outflow of the beverage B from the infusion chamber 3 (103) and its delivery in a cup T, i.e. a cup of coffee.

After dispensing the beverage B, the infusion circuit 4 (104) is emptied to fill again the infusion circuit 4 (104) with gas G at atmospheric pressure. Subsequently, the above steps may be repeated for preparing another beverage B.

In the machine 1 for emptying the infusion circuit 4, the source 9, i.e. the three-way valve 9, is arranged in the gas opening position so as to connect the inside of the infusion circuit 4 with the external environment. During the process of emptying the infusion circuit 4, the liquid and the gas possibly remained in the infusion circuit 4 are pushed out by the pressure generated in the infusion circuit 4 by the heating due to the heat exchanger of the liquid L. In other words, in the machine 1 the infusion circuit 4 is emptied thanks to the pressure developed in the infusion circuit 4 due to the transformation of the residual water contained in the heat exchanger 8, which, once heated up, turns into steam.

On the other hand, in the machine 101 the infusion circuit 104 is emptied by the gravity force, following the delivery of the beverage B. In particular, in the case shown in FIG. 2, the emptying occurs through the three-way valve 109, which, when arranged in the gas opening position, enables the emptying by gravity of the liquid L (the liquid L contained in the vertical portion of the curve 111*u*) and, at the same time, enables the gas G at atmospheric pressure to flow in the infusion circuit 104.

Being the final portion 11 (111) of the machine 1 (101) open both upstream, through the three-way valve 9 (109), and downstream, through 11*i* and 11*b* (111*u* and 111*d*), 3 (103), 11*c* (111*c*) and 12 (112), during and after the delivery, the water exits from the circuit 11 (111) through the valve 9 (109) and through the infusion chamber 3 (103) and the air takes its place. It is thus ensured that the final portion 11 (111) is completely full of gas G and free of liquid L after having prepared a beverage B and before starting preparing the next beverage B.

Advantageously, the amount of gas G supplied to the infusion circuit 4 (104) is determined by the position of the gas source 9 (109) with respect to the infusion chamber 3 (103); and/or by the extension in the practicable forward direction of the gas G in the duct 7 (107) without meeting any obstacle (closing valves or the like); and/or by the size of the flow section of the duct 7 (107).

Advantageously, the pressure of the gas G supplied to the infusion chamber 3 (103) depends on the shape, length and size of the final portion 11 (111) of the duct 7 (107).

The use of the machines 1' and 101' is similar to the use of the previously described machines 1 and 101. Beside what already described, the machines 1 and 101 provide the introduction of an already compressed gas G in the final portion 11 or 111. This increases the aeration capacity of coffee for preparing beverages B, while maintaining the reduced overall size of the machine 1 or 101.

The machines 1, 101, 1', 101' of the aforesaid type have the advantage of ensuring an aeration of the infusion product by means of pressurized gas to obtain a beverage B whose organoleptic qualities are better than those of the beverages prepared with traditional machines.

Moreover, the machine 1 (101) of the aforesaid type has the advantage of having a simple and inexpensive structure to manufacture.

Furthermore, the method and the machine 1 (101) of the aforesaid type avoid the use of any equipment for supplying the pressurized gas, such as air compressors or cylinders. This considerably reduces the overall size of a machine for preparing beverages provided with this equipment, together with a considerable cost reduction. For example, the aforesaid machine 1 (101) and method may also have a domestic use, while the machines of known type comprising the equipment for gas pressurization may be used only as a bench machines, namely for a professional use.

What is claimed is:

1. A method for preparing beverages by infusion by a machine, the machine comprising a feeding unit to feed a liquid, a source of gas at atmospheric pressure and an infusion chamber; wherein the machine comprises an infusion circuit connecting said feeding unit to said infusion chamber, the infusion circuit for infusing a beverage at a predetermined pressure; the gas source connecting the gas at atmospheric pressure of an external environment with an inside of said circuit; the gas source introducing the gas at atmospheric pressure in said circuit between the feeding unit and the infusion chamber; the method comprising a dispensing cycle for making a beverage, comprising:
   a first operation of at least partially filling said circuit with the gas at atmospheric pressure through said gas source, the gas at the atmospheric pressure being at an ambient pressure of the external environment and the ambient pressure of the gas remaining unadjusted upon introduction to the circuit;
   a second operation of closing a flow of gas from the external environment into the circuit through said gas source;
   a third operation of feeding the liquid into the circuit, the feeding of the liquid into the circuit compressing the gas, already present in the circuit, in the infusion chamber to the predetermined pressure before arrival of the liquid at the infusion chamber;
   a fourth operation of dispensing the beverage; and
   a fifth operation of at least partially emptying the circuit from the liquid before carrying out the next dispensing cycle; and
   wherein the machine comprises a heat exchanger to heat the liquid in the infusion circuit;
wherein the gas source is upstream of the exchanger, and is interposed between the feeding unit and the exchanger; wherein the gas source is a valve comprising a three-way valve that:
   connects the inside of the circuit to the external environment allowing the inlet of the gas at atmospheric pressure in said circuit during the first operation;
   blocks the passage of the gas in said circuit and allows the passage of the liquid coming from the feeding unit during the second operation; and
   interrupts the passage of the liquid and connects the circuit to the external environment allowing any residual liquid and/or gas to flow out of the circuit during the fifth operation.

2. The method according to claim 1, wherein, during the fifth operation, the residual liquid is pushed out of the circuit due to a pressure generated in the circuit during one or more of the third and the fourth operations by transformation of the residual water contained in the heat exchanger to steam once heated.

3. The method according to claim 1, wherein the machine comprises one or more valves where any residual liquid and/or gas flows out of the one or more valves during the fifth operation.

4. The method according to claim 3, wherein, during the fifth operation, the residual liquid is pushed out of the circuit due to the gravity force.

5. The method according to claim 1, wherein the machine comprises a feeder configured to feed a pressurized gas; wherein the method comprises an operation of feeding a pressurized gas, the gas pressurized at approximately 2 bars, into the circuit between the second and the third operation.

6. The method of claim 1, wherein the beverages comprise coffee or tea.

7. The method of claim 1, wherein the liquid comprises water.

8. The method of claim 1, wherein the gas at atmospheric pressure comprises air at atmospheric pressure.

9. The method of claim 1, wherein the circuit is inclined relative to vertical axis perpendicular to a horizontal support surface on which the machine is to be placed, wherein inclination of the circuit prevents the liquid from entering into the infusion chamber prior to pressurizing the gas to the predetermined pressure.

10. The method of claim 1, wherein the infusion circuit comprises a duct housing the gas source, wherein the duct comprises an initial portion, which is arranged upstream of the gas source relative to the feeding direction of the liquid, and a final portion, which is arranged downstream of the gas source relative to the feeding direction of the liquid, and wherein the final portion comprises a u-shaped curve having a concavity that faces a horizontal support surface on which the machine is to be placed.

11. A machine for preparing beverages by infusion, the machine comprising
a feeding unit to feed a liquid,
a source of gas at atmospheric pressure, and
an infusion chamber; wherein the machine comprises an infusion circuit for infusing a beverage at a predetermined pressure, the infusion circuit connecting said feeding unit to said infusion chamber; the gas source feeding the gas at atmospheric pressure into said circuit, the gas at the atmospheric pressure being at an ambient pressure of an external environment and the ambient pressure of the gas remaining unadjusted upon introduction to the circuit; the gas source feeding the gas at atmospheric pressure into the circuit between the feeding unit and the infusion chamber, and wherein the machine further comprises:
a heat exchanger to heat the liquid in the infusion circuit, wherein the gas source is upstream of the exchanger interposed between the feeding unit and the exchanger, and wherein the gas source is a three-way valve that:
connects an inside of the circuit to the external environment allowing the inlet of the gas at atmospheric pressure in said circuit;
blocks a flow of the gas from the external environment into said circuit; and
interrupts the passage of the liquid and connects the circuit to the external environment allowing any residual liquid and/or gas to flow out of the circuit; and
wherein the feeding unit feeds the liquid into the circuit compressing the gas, already present in the circuit, in the infusion chamber to the predetermined pressure before arrival of the liquid at the infusion chamber.

12. The machine according to claim 11 wherein the gas source is downstream of the exchanger interposed between the exchanger and the infusion chamber and wherein the gas source being configured to at least partly empty the infusion circuit of the liquid.

13. The machine according to claim 11, wherein the infusion circuit comprises a duct housing the gas source; wherein the duct comprises an initial portion, which is arranged upstream of the gas source relative to the feeding direction of the liquid, and a final portion, which is arranged downstream of the gas source relative to the feeding direction of the liquid; wherein at least a segment of said final portion is oriented so that the gravity force exerts a negative force upon the liquid flowing inside said segment from the feeding unit to the infusion chamber.

14. The machine according to claim 13, wherein said segment is at least partly perpendicular to a horizontal support surface; wherein said source is vertically interposed between said horizontal support surface and said segment and arranged in an opening position connecting the inside of the segment and the external environment and in which the segment is emptied of the liquid due to the gravity force and the gas in the segment.

15. The machine according to claim 11 and comprising a feeding unit that feeds a gas under pressure, wherein the feeding unit is configured for feeding pressurized gas into said infusion circuit between the infusion chamber and the gas source.

* * * * *